(12) United States Patent
Na et al.

(10) Patent No.: US 11,621,744 B2
(45) Date of Patent: *Apr. 4, 2023

(54) TERMINAL FOR TRANSMITTING REFERENCE SIGNAL TRANSMISSION DEVICE AND METHOD THEREOF

(71) Applicant: SK TELECOM CO., LTD., Seoul (KR)

(72) Inventors: Min Soo Na, Seoul (KR); Seung Young Ban, Seoul (KR); Chang Soon Choi, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/366,193

(22) Filed: Jul. 2, 2021

(65) Prior Publication Data

US 2021/0336739 A1 Oct. 28, 2021

Related U.S. Application Data

(63) Continuation of application No. 16/092,670, filed as application No. PCT/KR2017/005047 on May 16, 2017, now Pat. No. 11,088,795.

(30) Foreign Application Priority Data

Jul. 22, 2016 (KR) .......................... 10-2016-0093447

(51) Int. Cl.
*H04B 7/0413* (2017.01)
*H04L 27/26* (2006.01)
(Continued)

(52) U.S. Cl.
CPC ......... *H04B 7/0408* (2013.01); *H04B 7/0413* (2013.01); *H04L 5/00* (2013.01); *H04L 5/0048* (2013.01); *H04L 27/2626* (2013.01)

(58) Field of Classification Search
CPC ...... H04B 7/0408; H04B 7/0413; H04B 7/10; H04L 27/2626; H04L 5/00; H04L 5/0007;
(Continued)

(56) References Cited

U.S. PATENT DOCUMENTS 11,088,795 B2 * 8/2021 Na .......................... H04B 7/10
2010/0322179 A1 12/2010 Yu et al.
(Continued)

OTHER PUBLICATIONS

Verizon, "Verizon 5G TF; Air Interface Working Group; Verizon 5th Generation Radio Access; Physical Channels and Modulation (Release 1)," http://www.5gtf.net/V5G_211_vlp3.pdf, Jun. 2016, 81 pages.

(Continued)

*Primary Examiner* — Melvin C Marcelo
*Assistant Examiner* — Natali Pascual Peguero
(74) *Attorney, Agent, or Firm* — Hauptman Ham, LLP

(57) ABSTRACT

Disclosed is technology for supporting high-speed and low-latency performance in a 5G environment through implementation of a new reference signal transmission scheme appropriate for the 5G environment, that is, a mobile communication network environment for supporting high-speed and low-latency communication, which will appear afterwards.

14 Claims, 6 Drawing Sheets

(51) Int. Cl.
*H04L 5/00* (2006.01)
*H04B 7/0408* (2017.01)

(58) Field of Classification Search
CPC ..... H04L 5/0048; H04L 5/005; H04L 5/0083; H04L 5/0023
See application file for complete search history.

(56) References Cited

U.S. PATENT DOCUMENTS

| | | |
|---|---|---|
| 2011/0128909 A1 | 6/2011 | Luo et al. |
| 2014/0086111 A1 | 3/2014 | Li et al. |
| 2015/0237602 A1 | 8/2015 | Chae et al. |
| 2016/0020882 A1 | 1/2016 | Shimezawa et al. |
| 2016/0056934 A1 | 2/2016 | Li et al. |
| 2016/0211902 A1 | 7/2016 | Park et al. |

OTHER PUBLICATIONS

International Search Report dated Aug. 23, 2017, issued in corresponding International Application No. PCT/KR2017/005047.
Discussion on beam-based operation, 3GPP TSG RAN WG1 Meeting #85, CATT, May 23-27, 2016, 3 pages, Nanjing, China.
Korean Office Action dated Nov. 28, 2019, in connection with the Korean Patent Application No. 10-2016-0093447.
The Extended European Search Report for PCT/KR2017005047 dated Jan. 28, 2020.
Intel Corporation, "Aspects to consider for DL transmission of TTI shortening", 3GPP TSG-RAN WG1 #84, Feb. 15-19, 2016, St Julian's, Malta.
Okia et al., "Main components for forward compatible frame structure design in NR", 3GPP TSG-RAN WG1 #85, May 23-27, 2016, Nanjing, P.R. China.
Japanese Office Action dated Mar. 12, 2020 in connection with the counterpart Japanese Patent Application No. 2019-503450.

* cited by examiner

TERMINAL FOR TRANSMITTING REFERENCE SIGNAL TRANSMISSION DEVICE AND METHOD THEREOF

CROSS-REFERENCE TO RELATED APPLICATION

This application is a continuation of U.S. patent application Ser. No. 16/092,670, filed on Oct. 10, 2018, which is a National Phase of International Application No. PCT/KR2017/005047 filed on May 16, 2017 which is based upon and claims the benefit of priority to Korean Patent Application No. 10-2016-0093447 filed on Jul. 22, 2016 in the Korean Intellectual Property Office. The disclosures of the above-listed applications are hereby incorporated by reference in their entirety.

BACKGROUND OF THE INVENTION

1. Field of the Invention

The present disclosure relates to technology for reference signal transmission between apparatuses.

More specifically, the present disclosure relates to reference signal transmission technology appropriate for a future mobile communication network environment for a high-speed and low-latency service.

2. Description of the Prior Art

In the beamforming technology, it is generally understood that each of a transmitting device and a receiving device includes a plurality of antennas.

There are various technologies performing communication based on a beamforming technology where an improvement of transmission capacity is expected proportional to the number of transmitting/receiving antennas without using additional frequency or power. The representative technology thereof is a Multiple Input Multiple Output (MIMO) technology.

In a communication system using a MIMO technology, a transmission capacity gain can be most largely obtained from a diversity gain and a multiplexing gain through beamforming.

Meanwhile, a communication system may employ a Time Division Duplex (TDD) which variably allocates the same frequency radio resource to uplink (UL) or downlink (DL) according to time.

Recently, the communication system employing a TDD has employed a dynamic TDD which can adaptively cope with UL/DL traffic by adjusting a UL/DL ratio.

As a mobile communication network for transmitting large amounts of data with high-speed is advanced, it will evolve into a mobile communication network environment such as a fifth generation mobile communication network (hereinafter "5G") environment for supporting high-speed and low-latency communication during high-speed movement.

Meanwhile, in a mobile communication network environment, it is highly important for superior communication performance between a transmission apparatus and a reception apparatus to adaptively control a radio environment between the transmission apparatus and the reception apparatus by transmitting/receiving a reference signal. A fourth generation mobile communication network (LTE) environment adopts a scheme for fixedly transmitting/receiving a Cell-Specific Reference Signal (CRS) as a reference signal in each subframe.

However, the existing CRS is a reference signal inappropriate for a 5G environment for a high-speed and low-latency service and cannot utilize a dynamic TDD at all. Therefore, there is a need for a new reference signal replacing the existing CRS which is appropriate for the 5G environment based on a new dynamic TDD.

Therefore, the present disclosure is to propose a reference signal transmission method of a new scheme which is appropriate for a mobile communication network (5G) environment for supporting high-speed and low-latency communication.

SUMMARY OF THE INVENTION

An aspect of the present disclosure is to implement a new reference signal transmission scheme which is appropriate for a mobile communication network (5G) environment for supporting high-speed and low-latency communication.

In accordance with an aspect of the present disclosure, there is provided a terminal for transmitting a reference signal in a radio communication system including: a first reference signal transmitter configured to transmit a first reference signal at a particular time point in a subframe of a radio resource for uplink reference signal transmission, the particular time point being determined based on a data channel; and a second reference signal transmitter configured to transmit a second reference signal for a particular duration in the subframe of the radio resource, the particular duration being determined based on the data channel.

The data channel may be assigned to a symbol period in a plurality of symbols included in the subframe, the symbol period having consecutive symbols among the plurality of symbols, the particular time point may correspond to the first symbol of the symbol period where the transmission of the data channel is started, the transmission of the data channel and the transmission of the first reference signal may be started at the first symbol of the symbol period in the frame, the particular duration may correspond to the symbol period in the subframe, and the data channel and the second reference signal may be transmitted during the symbol period in the frame.

Specifically, the first reference signal transmitter and the second reference signal transmitter may be configured to allocate at least one of a frequency resource and a time resource for the first reference signal and the second reference signal for uplink transmission which is multiple of at least one of a frequency resource and a time resource allocated for the first reference signal and the second reference signal for downlink transmission.

Specifically, the first reference signal transmitter may be configured to transmit the first reference signal in a frequency domain of the first symbol.

Specifically, the second reference signal transmitter may be configured to transmit the second reference signal in one of remaining frequency blocks in which the first reference signal is not transmitted in frequency domain of the symbol period.

Specifically, when the first reference signal is transmitted to a reception apparatus through each of multiple antenna beams, the first reference signal transmitter may be configured to allocate at least two orthogonal frequency blocks for each of the multiple antenna beams by frequency division multiplexing (FDM) process for the frequency domain of the first symbol, and transmit the first reference signal in the at least two allocated frequency blocks of the frequency domain of the first symbol through each of the multiple antenna beams.

Specifically, when the second reference signal is transmitted to the reception apparatus through each of the multiple antenna beams, the second reference signal transmitter may be configured to transmit the second reference signal in each of the orthogonal frequency blocks of frequency domain of the particular symbol period.

Specifically, the orthogonal frequency blocks transmitting the second reference signal for the multiple antenna beams may be allocated to be corresponding to one of the frequency blocks transmitting the first reference signal for other antenna beam.

Specifically, when the first reference signal transmitter transmits the first reference signal through the multiple antenna beams, the first reference signal transmitter may be configured to puncture a frequency block corresponding to a frequency block transmitting the second reference signal for other antenna beam.

In accordance with another aspect of the present disclosure, there may be provided a method for transmitting a reference signal by a terminal, the method including: transmitting a first reference signal at a particular time point in a subframe of a radio resource for uplink reference signal transmission, the particular time point being determined based on a data channel; and transmitting a second reference signal for a particular duration in the subframe of the radio resource, the particular duration being determined based on a data channel.

The data channel may be assigned to a symbol period in a plurality of symbols included in the subframe, the symbol period having consecutive symbols among the plurality of symbols, the particular time point may correspond to the first symbol of the symbol period where the transmission of the data channel is started, the transmission of the data channel and the transmission of the first reference signal may be started at the first symbol of the symbol period in the frame, the particular duration may correspond to the symbol period in the subframe, and the data channel and the second reference signal may be transmitted during the symbol period in the frame.

Specifically, the method may further include transmitting the first reference signal comprises transmitting the first reference signal in a frequency domain of the first symbol; and transmitting the second reference signal comprises transmitting the second reference signal in one of remaining frequency blocks in which the first reference signal is not transmitted in frequency domain of the symbol period.

Specifically, the method may further include transmitting the first reference signal comprises, when the first reference signal is transmitted to a reception apparatus through each of multiple antenna beams; allocating at least two orthogonal frequency blocks for each of the multiple antenna beams by frequency division multiplexing (FDM) process for the frequency domain of the first symbol; and transmitting the first reference signal in the at least two allocated frequency blocks of the frequency domain of the first symbol through each of the multiple antenna beams.

Specifically, the step of transmitting the second reference signal may include, when the second reference signal is transmitted to the reception apparatus through each of the multiple antenna beams, transmitting the second reference signal in each of the orthogonal frequency blocks of frequency domain of the particular symbol period.

Specifically, the orthogonal frequency blocks transmitting the second reference signal for the multiple antenna beams may be allocated to be corresponding to one of the frequency blocks transmitting the first reference signal for other antenna beam.

Specifically, the step of transmitting the first reference signal may include, when the first reference signal transmitter transmits the first reference signal through the multiple antenna beams, puncturing a frequency block corresponding to a frequency block transmitting the second reference signal for other antenna beam.

The present disclosure implements a new reference signal transmission scheme which is appropriate for a mobile communication network (5G) environment for supporting high-speed and low-latency communication, thereby supporting high-speed and low-latency performance in the 5G environment.

DETAILED DESCRIPTION OF THE EXEMPLARY EMBODIMENTS

Figure 1:
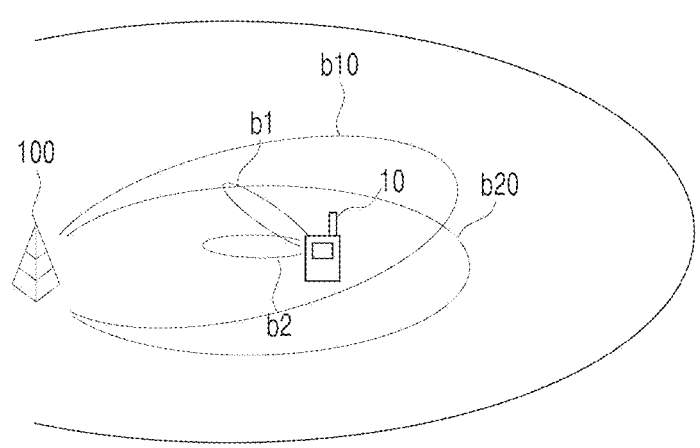
FIG. 1 is a view illustrating an example of a communication system to which a reference signal transmission scheme proposed in the present disclosure is applied.

It should be noted that the technical terms used in this specification are merely used to describe a particular embodiment and are not intended to limit the technical idea disclosed in this specification. Also, the technical terms used in this specification should be construed as having a general meaning understandable by those having ordinary knowledge in the technical field, to which the art disclosed in this specification pertains, unless especially defined as a different meaning in this specification, and should not be construed as having an excessively inclusive meaning or an excessively reduced meaning. Also, when a technical term used in this specification is an incorrect technical term failing to exactly express the technical idea disclosed in this specification, the technical term should be replaced by a technical term which can be correctly understood by those skilled in the art. Further, the general terms used in this specification should be construed as the definition in a dictionary or in accordance with the context, and should not be construed as having an excessively reduced meaning.

Further, a singular expression used in this specification includes a plural expression unless the context clearly indicates otherwise. In this specification, the term "configure", "comprise", or the like should not be construed as necessarily including all of several elements or steps described herein, and accordingly, should be construed as not including some of the several elements or steps, or should be construed as further including additional component(s) or step(s).

Further, although terms including ordinal numbers such as "first", "second", and the like used in this specification may be used to describe various elements, the elements should not be limited by the terms. The terms are only used to distinguish one element from another. For example, a first element may be termed a second element, and similarly, a second element may be termed a first element without departing from the scope of the present disclosure.

Hereinafter, embodiments disclosed in this specification will be described in detail with reference to the accompanying drawings, and identical or similar elements are assigned identical reference numerals regardless of the drawing numbers and a repeated description thereof will be omitted.

Further, in describing the art disclosed in this specification, a detailed description of the known related art incorporated herein will be omitted when it may make the subject matter of the art disclosed in this specification rather unclear. Further, it should be noted that the accompanying drawings are just provided to facilitate the understanding of the technical idea disclosed in this specification and should not be construed as limiting the technical idea.

Hereinafter, embodiments of the present disclosure will be described in detail with reference to the accompanying drawings. It should be noted that in assigning reference numerals to elements in the drawings, the same reference numerals will designate the same elements where possible although they are shown in different drawings. Also, in the following description of the present disclosure, a detailed description of known functions and configurations incorporated herein will be omitted when it may make the subject matter of the present disclosure rather unclear.

Hereinafter, embodiments of the present disclosure will be described with reference to the accompanying drawings.

FIG. 1 is a view illustrating an example of a communication system to which the present disclosure is applied.

The present disclosure proposes a new reference signal transmission scheme appropriate for a mobile communication network environment, that is, a 5G environment, for supporting high-speed and low-latency communication.

Therefore, a reference signal transmission apparatus, in which the reference signal transmission scheme according to the present disclosure is implemented, is an apparatus using a communication service which is based on a mobile communication network.

In this regard, a base station 100 and a terminal 10 illustrated in FIG. 1 may be the most representative of reference signal transmission apparatuses according to the present disclosure.

The base station 100 and the terminal 10 may provide/use a communication service through a single antenna beam (Single-Input Single-Output (SISO)). In this case, a reference signal transmission scheme according to the present disclosure described below may also transmit reference signals through a single antenna beam.

The base station 100 and the terminal 10 may provide/use a communication service through multiple antenna beams (MIMO). In this case, a reference signal transmission scheme according to the present disclosure described below may also transmit reference signals through multiple antenna beams.

In this regard, a high-speed and low-latency mobile communication network environment such as a 5G environment adopt MIMO technology in line with advancement in transmitting large amounts of data with high-speed transmission. FIG. 1 illustrates a communication system employing MIMO technology.

For convenience of description, FIG. 1 illustrates an embodiment in which the base station 100 and the terminal 10 provide/use a communication service through multiple antenna beams (e.g., dual antenna beams).

In the communication system to which the present disclosure is applied, a TDD is employed for variably allocating the same frequency radio resource to UL or DL according to time. Specifically, a dynamic TDD capable of adaptively coping with UL/DL traffic by adjusting a UL/DL ratio can be employed.

In the present disclosure, a DL transmission scheme where the base station 100 transmits a reference signal to the terminal 10 corresponds to a UL transmission scheme where the terminal 10 transmits a reference signal to the base station 100.

Accordingly, the reference signal transmission apparatus according to the present disclosure may be the base station 100 or the terminal 10.

When the base station 100 is the reference signal transmission apparatus according to the present disclosure, the base station 100 transmits a first reference signal at a particular time point determined based on a data channel, and transmits a second reference signal for a particular duration determined based on the data channel in a subframe of a radio resource for DL reference signal transmission.

Meanwhile, when the terminal 10 is the reference signal transmission apparatus according to the present disclosure, the terminal 10 transmits a first reference signal at a particular time point determined based on a data channel, and transmits a second reference signal for a particular duration determined based on the data channel in a subframe of a radio resource for UL reference signal transmission.

Figure 2:
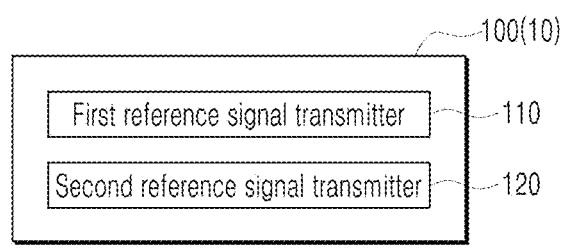
FIG. 2 is a view illustrating a configuration of a reference signal transmission apparatus according to an embodiment of the present disclosure.

Referring to FIG. 2, the reference signal transmission apparatus according to an embodiment of the present disclosure will be described.

Referring to FIG. 2, the base station 100 will be described as a reference signal transmission apparatus according to the present disclosure convenience of description. Accordingly, in the following description, a reference signal transmitted by the reference signal transmission apparatus 100 according to the present disclosure refers to a signal transmitted to the terminal 10.

As illustrated in FIG. 2, the reference signal transmission apparatus 100 according to the present disclosure includes a first reference signal transmitter 110 configured to transmit a first reference signal at a particular time point determined based on a data channel in a subframe of radio source for reference signal transmission, and a second reference signal transmitter 120 configured to transmit a second reference signal for a particular duration determined based on the data channel in the subframe of radio source.

A particular time point at which a first reference signal is transmitted in a subframe is determined according to a symbol period to which transmission of a data channel is assigned in the subframe.

A particular duration for which a second reference signal is transmitted in a subframe is determined according to a symbol period to which transmission of a data channel is assigned in the subframe.

In other word, the reference signal transmission scheme according to the present disclosure is a dynamic TDD-based reference signal transmission scheme where a particular time point at which a first reference signal is transmitted is changed and a particular duration for which a second reference signal is transmitted is changed according to the position of a symbol period (hereinafter "data channel symbol period") to which transmission of a data channel is assigned in a subframe.

Hereinafter, the reference signal transmission scheme according to the present disclosure will be described in more detail.

A first reference signal is a Demodulation Reference Signal (DM-RS).

That is, the present disclosure proposes a user-specific DM-RS as a new reference signal for replacing an existing cell-specific CRS, which is based on a dynamic TDD and appropriate for a 5G environment.

Also, a particular time point corresponds to a particular symbol of a plurality of symbol included in the subframe, and the particular symbol is a first symbol of the symbol period where the transmission of the data channel is started.

Figure 3:
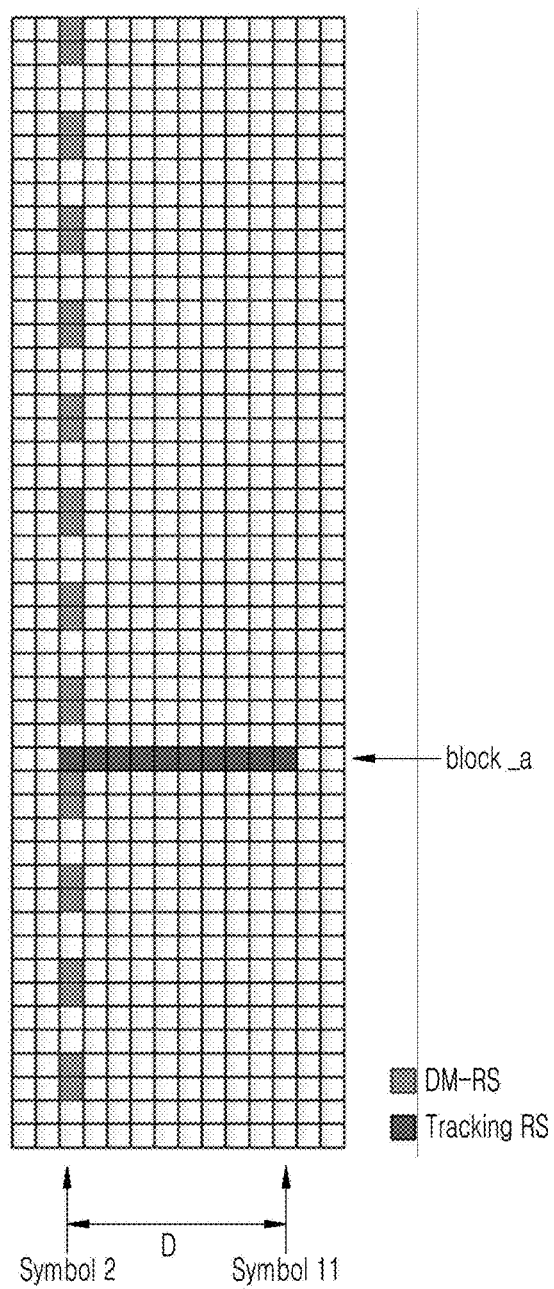
FIG. 3 is a view illustrating an example of a structure of a subframe in which a reference signal transmission apparatus transmits a reference signal through a single antenna beam according to an embodiment of the present disclosure.

FIG. 3 illustrates a structure of a subframe (hereinafter "reference signal subframe") in which the reference signal transmission apparatus 100 transmits a reference signal through a single antenna beam.

As illustrated in FIG. 3, a subframe of a radio resource for reference signal transmission, that is, a reference signal subframe, includes multiple symbols, for example, 14 Orthogonal Frequency Division Multiplexing (OFDM) symbols.

In this regard, it will be described in detail below that a function (a method) of configuring a structure of a reference signal subframe for transmitting a first reference signal (i.e., a DM-RS) by the first reference signal transmitter 110.

First, the first reference signal transmitter 110 recognizes a data channel symbol period which is a symbol period to which transmission of a data channel is assigned in a subframe of a radio resource for data transmission (hereinafter "data subframe").

For example, when a data subframe includes 14 OFDM symbols (symbols 0 to 13), symbols from a third symbol (symbol 2) to a twelfth symbol (symbol 11) are allocated as a data channel symbol period.

In this regard, when recognizing the data channel symbol period (symbols 2 to 11), the first reference signal transmitter 110 allocates a particular symbol to a first reference signal (i.e., a DM-RS). The particular symbol corresponds to a first symbol (symbol 2) within the data channel symbol period (symbols 2 to 11) of 14 symbols constituting the reference signal subframe. The transmission of a data channel is started at the first symbol (symbol 2).

Then, the first reference signal transmitter 110 transmits a DM-RS in a frequency domain of symbol 2 which is a particular symbol within the reference signal subframe.

In FIG. 3, the first reference signal transmitter 110 intermittently allocates two consecutive frequency blocks in the frequency domain of symbol 2, and transmits a DM-RS in the allocated frequency blocks.

It goes without saying that in addition to the allocation scheme illustrated in FIG. 3, a frequency block for DM-RS transmission may be allocated in the frequency domain of symbol 2 by using various schemes.

To sum up, the structure of the reference signal subframe proposed in the present disclosure is designed such that a DM-RS is transmitted in a symbol frequency domain of a first symbol (e.g., symbol 2), at which transmission of a data channel is started within the reference signal subframe. A reception apparatus (i.e., the terminal 10) receives the DM-RS at a time point (symbol 2) when the reception apparatus starts reception of a data channel that the reference signal transmission apparatus 100 (a base station) transmits during the data channel symbol period (symbols 2 to 11).

By this configuration, when the reception of the data channel is started, a reception apparatus (i.e., the terminal 20) may also receive a DM-RS and immediately perform DM-RS-based data channel demodulation, thereby supporting high-speed and low-latency performance for 5G environment.

A second reference signal is a tracking RS.

That is, the present disclosure proposes a tracking RS as a new reference signal based on a dynamic TDD. The tracking RS is appropriate for a 5G environment for beam-tracking and beam-switching, which is not used (defined) in the fourth generation mobile communication network (LTE) environment.

Also, a particular duration, for which a second reference signal (i.e., a tracking RS) is transmitted in a subframe, is a particular symbol period during which a data channel is transmitted among multiple symbols constituting the subframe.

Hereinafter, it will be described in detail below referring to FIG. 3 that a function (a method) of configuring a structure of a reference signal subframe in order to transmit a second reference signal (i.e., a tracking RS) by the second reference signal transmitter 120.

First, the second reference signal transmitter 120 recognizes a symbol period (i.e., a data channel symbol period) to which transmission of a data channel is assigned within a subframe of a radio resource for data transmission (hereinafter "data subframe").

As in the above-described example, symbols from a third symbol (symbol 2) to a twelfth symbol (symbol 11) are allocated as a data channel symbol period when a data subframe includes 14 OFDM symbols (symbols 0 to 13).

In this regard, when recognizing the data channel symbol period (symbols 2 to 11) from 14 symbols constituting a reference signal subframe, the second reference signal transmitter 120 allocates a particular symbol period D from the third symbol (symbol 2) to the twelfth symbol (symbol 11) within the reference signal subframe to the second reference signal (i.e., a tracking RS).

Then, the second reference signal transmitter 120 transmits a tracking RS in one frequency block of the remaining frequency blocks in which a DM-RS is not transmitted (which are not allocated to the DM-RS) in a frequency domain of the particular symbol period (D=symbols 2 to 11) within the reference signal subframe.

In FIG. 3, the second reference signal transmitter 120 transmits a tracking RS in a frequency block block_a of the remaining frequency blocks in which a DM-RS is not transmitted (which are not allocated to the DM-RS) in a frequency domain of the particular symbol period (D=symbols 2 to 11) within the reference signal subframe.

To sum up, the structure of the reference signal subframe proposed in the present disclosure is designed such that a tracking RS is transmitted in a frequency block of a symbol period (e.g., symbols 2 to 11) during which transmission of a data channel continues within the reference signal subframe. A reception apparatus (i.e., the terminal 20) continuously receives the tracking RS during the data channel symbol period (symbols 2 to 11) during which the reference signal transmission apparatus 100 (a base station) transmits a data channel.

By this configuration, even when a frequency offset occurs due to high-speed movement of a reception apparatus (i.e., the terminal 20), the reception apparatus (i.e., the terminal 20) may receive a tracking RS during a data channel being received and perform tracking RS-based beam-tracking and beam-switching thereby supporting high-speed and low-latency performance for a 5G environment.

Figure 4A:
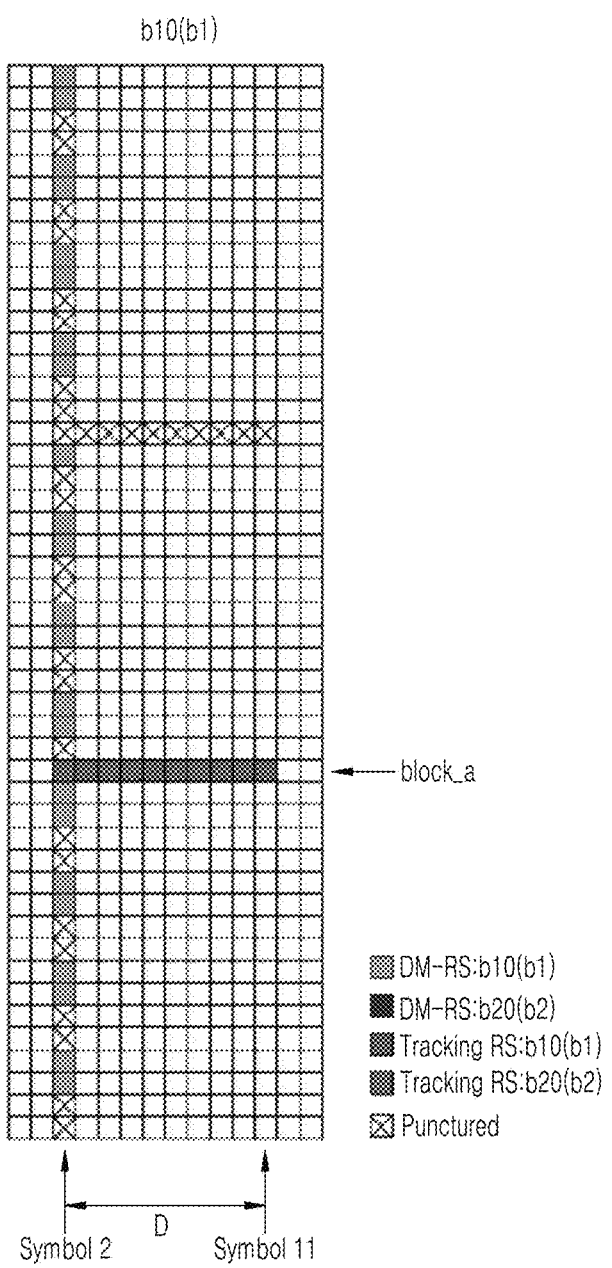
FIG. 4A and FIG. 4B are views illustrating an example of a structure of a subframe in which a reference signal transmission apparatus transmits a reference signal through dual antenna beams according to an embodiment of the present disclosure.
Figure 4B:
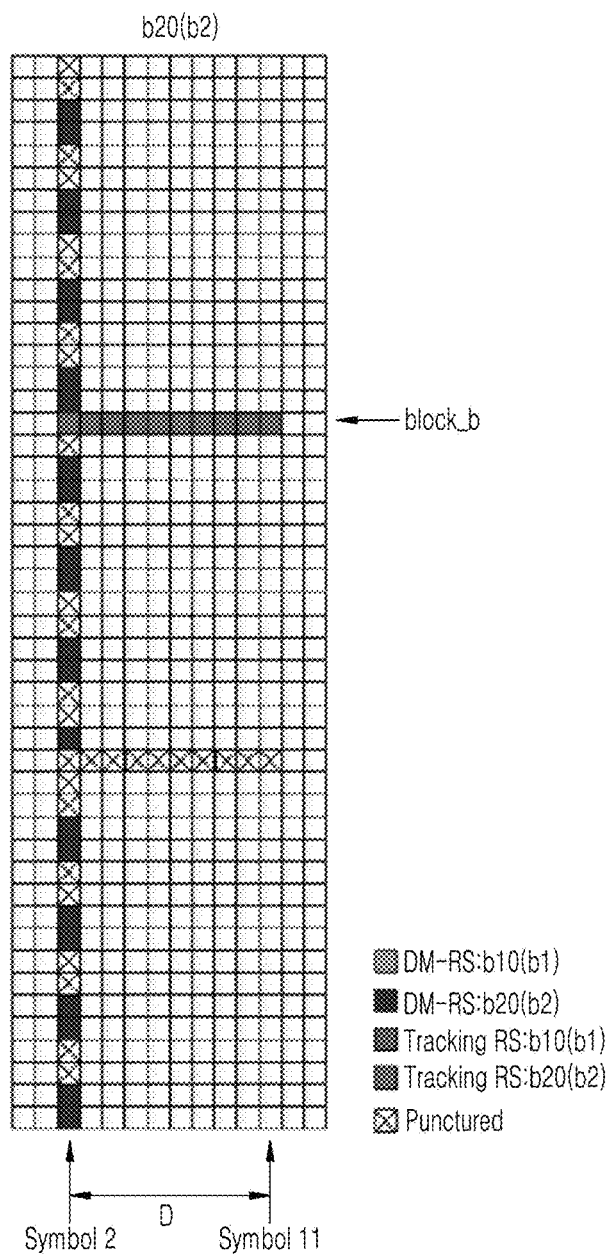

Referring to FIG. 4A and FIG. 4B, an embodiment in which the reference signal transmission apparatus 100 transmits a reference signal through multiple antenna beams will be described.

When the first reference signal transmitter 110 transmits a first reference signal (i.e., a DM-RS) to the same reception apparatus (i.e., one terminal 10) through each of multiple antenna beams, the first reference signal transmitter 110 FDM-processes a frequency domain of the above-described particular symbol (i.e., symbol 2), allocates at least two orthogonal frequency blocks for each of the multiple antenna beams, and transmits a DM-RS in the at least two allocated frequency blocks in the frequency domain of symbol 2 through each of the multiple antenna beams.

It will be described below for a case in which the base station 100 and the terminal 10 transmit reference signals through dual antenna beams.

FIG. 4A and FIG. 4B illustrate a structure of a subframe (hereinafter "reference signal subframe") in which the reference signal transmission apparatus 100 transmits a reference signal through dual antenna beams b10 and b20.

Referring to FIG. 4A and FIG. 4B, it will be described in detail below that a function (a method) of configuring a structure of a reference signal subframe in order to transmit a DM-RS through each of the dual antenna beams b10 and b20 by the first reference signal transmitter 110.

Identically to the case when a reference signal is transmitted through a single antenna beam which has been described with reference to FIG. 3, the first reference signal transmitter 110 allocates a particular symbol to a first reference signal (i.e., a DM-RS). The particular symbol corresponds to a first symbol (symbol 2) within a data channel symbol period (symbols 2 to 11) of 14 symbols constituting the reference signal subframe. Transmission of a data channel is started at the first symbol (symbol 2).

Then, the first reference signal transmitter 110 FDM-processes a frequency domain of symbol 2 within the reference signal subframe so as to allocate at least two orthogonal frequency blocks for each of the dual antenna beams b10 and b20.

In FIG. 4A and FIG. 4B, the first reference signal transmitter 110 FDM-processes a frequency domain of symbol 2 for each of two consecutive frequency blocks so as to allocate at least two mutually orthogonal frequency blocks for each of the antenna beams b10 and b20.

It goes without saying that in addition to the allocation scheme illustrated in FIG. 4A and FIG. 4B, it is possible to FDM-process the frequency domain of symbol 2 and allocated orthogonal frequency block for each of the dual antenna beams b10 and b20 by using various schemes.

The first reference signal transmitter 110 transmits a DM-RS in the at least two frequency blocks which is allocated for each of the dual antenna beams b10 and b20 by FDM-process and allocation for the frequency domain of symbol 2.

The first reference signal transmitter 110 punctures a frequency block for each of the dual antenna beams b10 and b20 which corresponds to a frequency block allocated for the other antenna beam by FDM-process and allocation for the frequency domain of symbol 2. Therefore, it is possible to ensure mutual orthogonality.

To sum up, the structure of the reference signal subframe proposed in the present disclosure is designed such that DM-RSs are respectively transmitted through orthogonal frequency block for each of the dual antenna beams b10 and b20 in a frequency domain of a first symbol (e.g., symbol 2) at which transmission of a data channel is started within the reference signal subframe. The terminal 20, which is to respectively receive DM-RSs through the dual antenna beams b10 and b20, receives the respective corresponding DM-RSs at a time point (symbol 2) when the terminal 20 starts to receive data channels through the respective dual antenna beams b10 and b20 from the reference signal transmission apparatus 100 (a base station).

Meanwhile, when the second reference signal transmitter 120 respectively transmits second reference signals (i.e., tracking RSs) through multiple antenna beams to a reception apparatus (i.e., the terminal 10), the second reference signal transmitter 120 transmits tracking RSs in mutually orthogonal frequency blocks in frequency domains of the above-described particular symbol period (i.e., a symbol period (symbols 2 to 11)) for each of multiple antenna beams.

Referring to FIG. 4A and FIG. 4B, it will be described in detail below that a function (a method) of configuring a structure of a reference signal subframe in order to respectively transmit tracking RSs through the dual antenna beams b10 and b20 by the second reference signal transmitter 120.

First, identically to the case when a reference signal is transmitted through a single antenna beam which has been described with reference to FIG. 3, the second reference signal transmitter 120 allocates a particular symbol period to a tracking RS. The particular symbol period corresponds to a data channel symbol period (symbols 2 to 11) during which a data channel is transmitted among 14 symbols constituting a reference signal subframe.

Then, the second reference signal transmitter 120 allocates orthogonal frequency block in frequency domains of the particular symbol period (D=symbols 2 to 11) within the reference signal subframe for each of the dual antenna beams b10 and b20.

In this configuration, frequency blocks transmitting tracking RSs for each of the multiple antenna beams corresponds to one frequency block of frequency blocks in which a DM-RS is transmitted for a other antenna beam. Therefore, it is possible to ensure mutual orthogonality.

As illustrated in FIG. 4A and FIG. 4B, when tracking RSs are transmitted through frequency blocks block_a and block_b for each of the dual antenna beams b10 and b20, the frequency block block_a corresponds to one of frequency blocks in which a DM-RS is transmitted for other antenna beam (i.e., the antenna beam b20), and the frequency block block_b corresponds to one of frequency blocks in which a DM-RS is transmitted for other antenna beam (i.e., the antenna beam b10).

Due to this scheme, the frequency blocks for transmitting DM-RSs for each of the dual antenna beams b10 and b20 have a mutual orthogonality due to FDM-processing. Therefore, the frequency blocks block_a and block_b, which are allocated for transmitting tracking RSs for each of the dual antenna beams b10 and b20 are mutually orthogonal.

Also, in the embodiment in which the frequency blocks block_a and block_b are allocated for the dual antenna beams b10 and b20 respectively according to the above-described scheme, the first reference signal transmitter 110 punctures a frequency block of at least two allocated frequency blocks in a frequency domain of a particular symbol 2 for each of the dual antenna beams b10 and b20 where the punctured frequency block corresponds to a frequency block transmitting a tracking RS for other antenna beam. The first reference signal transmitter 110 transmits a DM-RS through a frequency block except the punctured frequency block.

That is, in the case of the antenna beam b10, the first reference signal transmitter 110 punctures a frequency block from at least two allocated frequency blocks in a frequency domain of symbol 2, which corresponds to the frequency block block_b transmitting a tracking RS for the other antenna beam (i.e., the antenna beam b20) and transmits a DM-RS.

Also, in the case of the antenna beam b20, the first reference signal transmitter 110 punctures a frequency block from at least two allocated frequency blocks in a frequency domain of symbol 2, which corresponds to the frequency block block_a transmitting a tracking RS for the other antenna beam (i.e., the antenna beam b10) and transmits a DM-RS.

In FIG. 4A and FIG. 4B, the second reference signal transmitter 120 transmits tracking RSs in the frequency blocks block_a and block_b, which are mutually orthogonal in frequency domains of a particular symbol period (D=symbols 2 to 11) within a reference signal subframe for each of the dual antenna beams b10 and b20.

In this case, the second reference signal transmitter 120 punctures a frequency block from in the frequency domains of the particular symbol period (D=symbols 2 to 11) for each of the dual antenna beams b10 and b20, where the punctured frequency block corresponds to a frequency block allocated for the other antenna beam. The second reference signal transmitter 120 does not transmit signal through the punctured frequency block, thereby making it possible to ensure a mutual orthogonality.

To sum up, the structure of the reference signal subframe proposed in the present disclosure is designed such that mutually orthogonal tracking RSs are respectively transmitted through the dual antenna beams b10 and b20 in a frequency block of a symbol period (e.g., symbols 2 to 11) during which transmission of a data channel continues within the reference signal subframe. The terminal 20, which is to receive tracking RSs through the dual antenna beams b10 and b20, continuously receives the respective corresponding tracking RSs during a data channel symbol period (symbols 2 to 11) for which data channels are respectively received through the dual antenna beams b10 and b20 from the reference signal transmission apparatus 100 (a base station).

According to the present disclosure, a DL transmission scheme in which the base station 100 transmits a reference signal to the terminal 10 corresponds to a UL transmission scheme in which the terminal 10 transmits a reference signal to the base station 100.

Accordingly, the present disclosure may be applied to a case when the terminal 10 as the reference signal transmission apparatus according to the present disclosure transmits a UL reference signal.

A transmission output of the terminal 10 is lower than that of the base station 100. Therefore, a larger number of frequency resources (frequency blocks) and time resources (symbols) for a first reference signal (a DM-RS) and a second reference signal (a tracking RS) is allocated for the UL case where the reference signal transmission apparatus according to the present disclosure is the terminal 10 than the DL case where the reference signal transmission apparatus according to the present disclosure is the base station 100.

That is, the first reference signal transmitter 110 may be configured to allocate at least one of a frequency resource (a frequency block) and a time resource (a symbol) for a first reference signal (a DM-RS) for uplink transmission which is more than (ex. multiple) at least one of a frequency resource (a frequency block) and a time resource (a symbol) for a first reference signal (a DM-RS) for downlink transmission.

Also, the second reference signal transmitter 120 may be configured to allocate at least one of a frequency resource (a frequency block) and a time resource (a symbol) for a second reference signal (a tracking RS) for uplink transmission which is more than (ex. multiple) at least one of a frequency resource (a frequency block) and a time resource (a symbol) for a first reference signal (a DM-RS) for downlink transmission.

In this configuration, it is determined through a control channel of the base station 100 when the terminal 10 (a reference signal transmission apparatus) initially accesses the base station 100 which resource of a frequency resource (a frequency block) and a time resource (a symbol) is allocated and how much (e.g., multiples) of resources are allocated.

For example, a UL reference signal is transmitted through a single antenna beam as illustrated in FIG. 3.

In this case, the first reference signal transmitter 110 is configured to intermittently allocate four consecutive frequency blocks in a frequency domain of symbol 2, and transmits a DM-RS in the allocated frequency blocks. Therefore, the first reference signal transmitter 110 may be configured to allocate frequency resources (frequency blocks) for a first reference signal (a DM-RS) for UL transmission which is multiple of those for DL transmission.

Alternatively, the first reference signal transmitter 110 is configured to intermittently allocate two consecutive frequency blocks in a frequency domain of symbols (i.e., symbol 2+symbol 1 or 3) including a first symbol (symbol 2) of a data channel, and a previous symbol 1 adjacent to symbol 2 or a following symbol 3 adjacent thereto, and transmits a DM-RS in the allocated frequency blocks. Therefore, the first reference signal transmitter 110 may be configured to allocate time resources (symbols) for a first reference signal (a DM-RS) for UL transmission which is multiple of those for DL transmission.

Alternatively, the first reference signal transmitter 110 is configured to intermittently allocate four consecutive frequency blocks in the frequency domain of symbol 2+symbol 1 or 3, and transmits a DM-RS in the allocated frequency blocks. Therefore, the first reference signal transmitter 110 may be configured to allocate frequency resources (frequency blocks) and time resources (symbols) for a first reference signal (a DM-RS) for UL transmission which is multiple of those for DL transmission.

Meanwhile, the second reference signal transmitter 120 is configured to transmit a tracking RS in frequency blocks block_a and block_x (not illustrated) among the remaining frequency blocks in which a DM-RS is not transmitted (which are not allocated to the DM-RS) in frequency domains of a particular symbol period (D=symbols 2 to 11) within a reference signal subframe. Therefore, the second reference signal transmitter 120 may be configured to allocate frequency resources (frequency blocks) for a second reference signal (a tracking RS) for UL transmission which is multiple of those for DL transmission.

Alternatively, the second reference signal transmitter 120 is configured to transmit a tracking RS in the frequency block block_a among the remaining frequency blocks in which a DM-RS is not transmitted (which are not allocated to the DM-RS) in frequency domains of symbol period (i.e., a particular symbol period (symbols 2 to 11)+symbols (L+M=D)) including a particular symbol period (D=symbols 2 to 11), symbols (the number of which is L) adjacent to symbol 2, and symbols (the number of which is M) adjacent to symbol 11. Therefore, the second reference signal transmitter 120 may be configured to allocate time resources (symbols) for a second reference signal (a tracking RS) for UL transmission which is multiple of those for DL transmission.

Alternatively, the second reference signal transmitter 120 is configured to transmit a tracking RS in the frequency blocks block_a and block_x (not illustrated) among the remaining frequency blocks in which a DM-RS is not transmitted (which are not allocated to the DM-RS) in the frequency domains of the particular symbol period (symbols 2 to 11)+symbols (L+M=D). Therefore, the second reference signal transmitter 120 may be configured to allocate frequency resources (frequency blocks) and time resources (symbols) for a second reference signal (a tracking RS) for UL transmission which is multiple of those for DL transmission.

When a reference signal is transmitted through multiple antenna beams (e.g., dual antenna beams), at least one of a frequency resource (a frequency block) and a time resource (a symbol) for transmitting a first reference signal (a DM-RS) and a second reference signal (a tracking RS) for uplink transmission is more than (ex. multiple) at least one of a frequency resource (a frequency block) and a time resource (a symbol) for transmitting a first reference signal (a DM-RS) and a second reference signal (a tracking RS) for downlink transmission.

In the 5G standards currently being discussed, a CRS which is fixedly transmitted (transmitted/received) in each subframe is designed such that the CRS is not transmitted, and there is a circumstantial need for a reference signal for data channel demodulation which will replace the existing CRS.

Also, in order to support a structure of a self-contained subframe defined for a high-speed and low-latency service in a 5G frame structure, there is a circumstantial need for a reference signal for supporting a DL/UL subframe type based on fast processing and a dynamic TDD.

The present disclosure can satisfy the above-described circumstantial issues by proposing a new transmission scheme for a DM-RS and a tracking RS which are based on a dynamic TDD and appropriate for a 5G environment for supporting high-speed and low-latency communication.

As described above, the reference signal transmission apparatus according to the present disclosure implements a new reference signal transmission scheme which is appropriate for a 5G environment (i.e., a mobile communication network environment for supporting high-speed and low-latency communication), thereby supporting high-speed and low-latency performance in the 5G environment.

Figure 5:
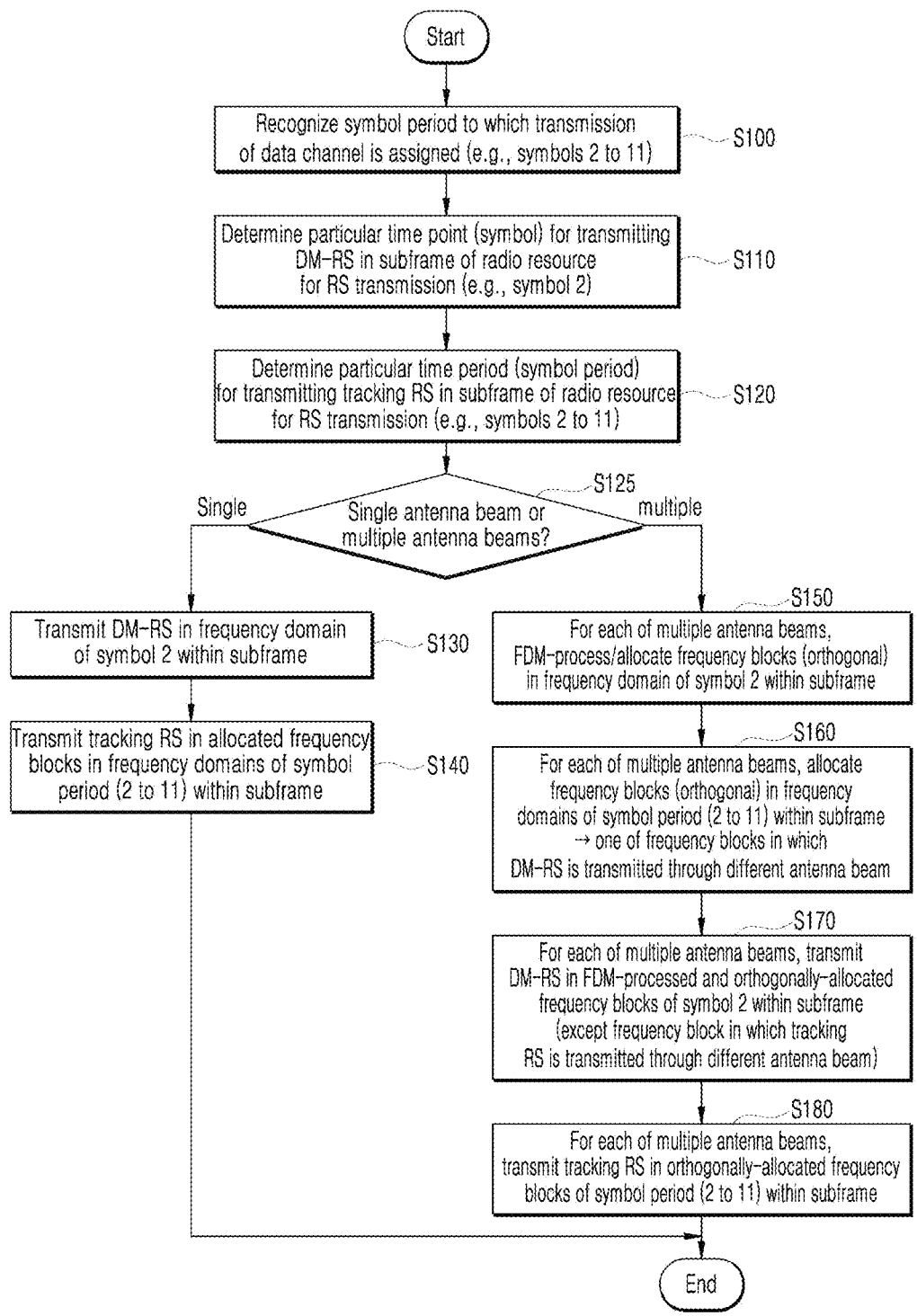
FIG. 5 is a flowchart illustrating a flow of a method for transmitting a reference signal according to an embodiment of the present disclosure.

Hereinafter, referring to FIG. 5, a reference signal transmission method according to an embodiment of the present disclosure will be described in detail.

For convenience of description, a description will be made for the base station 100 being a reference signal transmission apparatus so as to coincide with the foregoing description.

In operation S100, the reference signal transmission method of the base station 100 according to present disclosure recognizes a symbol period (i.e., a data channel symbol period) to which transmission of a data channel is assigned in a subframe (hereinafter "data subframe") of a radio resource for data transmission.

For example, symbols from a third symbol (symbol 2) to a twelfth symbol (symbol 11) are allocated as the data channel symbol period in a data subframe including 14 OFDM symbols (symbols 0 to 13).

Also, in operation S110, the reference signal transmission method of the base station 100 according to present disclosure determines a particular time point (symbol) for transmitting a DM-RS in a subframe of a radio source for reference signal transmission (i.e., a reference signal subframe), on the basis of the position of the data channel symbol period (i.e., the data channel).

Specifically, the reference signal transmission method of the base station 100 according to present disclosure allocates a particular symbol to a first reference signal (i.e., a DM-RS). The particular symbol corresponds to a first symbol (symbol 2) within the data channel symbol period (symbols 2 to 11) among 14 symbols constituting the reference signal subframe, wherein transmission of the data channel is started at the first symbol (symbol 2).

Meanwhile, in operation S120, the reference signal transmission method of the base station 100 according to present disclosure determines a particular duration (a symbol period) for transmitting a tracking RS in the subframe of the radio source for reference signal transmission (i.e., the reference signal subframe) on the basis of the position of the data channel symbol period (i.e., the data channel).

Specifically, the reference signal transmission method of the base station 100 according to present disclosure allocates a particular symbol period D to a second reference signal (i.e., a tracking RS). The particular symbol period corresponds to the data channel symbol period (symbols 2 to 11) during which the data channel is transmitted among 14 symbols constituting the reference signal subframe.

Then, in operation S125, the reference signal transmission method of the base station 100 according to present disclosure is operated to distinguish between a case, in which a reference signal is transmitted through a single antenna beam, and a case in which a reference signal is transmitted through multiple antenna beams (e.g., dual antenna beams).

First, referring to FIG. 3, the case in which a reference signal is transmitted through a single antenna beam will be described.

In operation S130, the reference signal transmission method of the base station 100 according to present disclosure transmits a DM-RS in a frequency domain of the particular symbol (symbol 2) included in the reference signal subframe.

In FIG. 3, the reference signal transmission method of the base station 100 according to present disclosure intermittently allocates two consecutive frequency blocks in the frequency domain of symbol 2, and transmits a DM-RS in the allocated frequency blocks.

In addition to the allocation scheme illustrated in FIG. 3, a frequency block for DM-RS transmission in the frequency domain of symbol 2 may be allocated using various schemes.

Also, in operation S140, the reference signal transmission method of the base station 100 according to present disclosure transmits a tracking RS in an allocated frequency block of the remaining frequency blocks in which a DM-RS is not transmitted (which are not allocated to the DM-RS) for frequency domains of the particular symbol period (D=symbols 2 to 11) within the reference signal subframe.

In FIG. 3, the reference signal transmission method of the base station 100 according to present disclosure transmits a tracking RS in an allocated frequency block block_a of the remaining frequency blocks in which a DM-RS is not transmitted (which are not allocated to the DM-RS) for frequency domains of the particular symbol period (D=symbols 2 to 11) within the reference signal subframe.

Meanwhile, referring to FIG. 4A and FIG. 4B, the case in which a reference signal is transmitted through multiple antenna beams (e.g., dual antenna beams) will be described.

In operation S150, the reference signal transmission method of the base station 100 according to present disclosure FDM-processes the frequency domain of symbol 2 in the reference signal subframe, so as to allocate at least two mutually orthogonal frequency blocks for each of the dual antenna beams b10 and b20.

In FIG. 4A and FIG. 4B, the reference signal transmission method of the base station 100 according to present disclosure FDM-processes the frequency domain of symbol 2 for each of two consecutive frequency blocks, so as to allocate at least two mutually orthogonal frequency blocks for each of the antenna beams b10 and b20.

It goes without saying that in addition to the allocation scheme illustrated in FIG. 4A and FIG. 4B, it is possible to FDM-process the frequency domain of symbol 2 and allocate mutually orthogonal frequency blocks for each of the dual antenna beams b10 and b20 by using various schemes.

In this configuration, the reference signal transmission method of the base station 100 according to present disclosure punctures a frequency block for each of the dual antenna beams b10 and b20. The punctured frequency block corresponds to a frequency block which is FDM-processed and allocated to a different antenna beam in the frequency domain of symbol 2. The punctured frequency block does not transmit a signal, thereby ensuring a mutual orthogonality.

Also, in operation S160, the reference signal transmission method of the base station 100 according to present disclosure allocates orthogonal frequency blocks for the frequency domains of the particular symbol period (D=symbols 2 to 11) in the reference signal subframe for each of the dual antenna beams b10 and b20.

In this configuration, frequency blocks in which tracking RSs are transmitted for through each of the dual antenna beams b10 and b20 are allocated to correspond to one of frequency blocks in which a DM-RS is transmitted through other antenna beam of the dual antenna beams b10 and b20, and thus are mutually orthogonal.

As illustrated in FIG. 4A and FIG. 4B, when tracking RSs are transmitted through the frequency blocks block_a and block_b for each of the dual antenna beams b10 and b20, the frequency blocks block_a is allocated to correspond to one of frequency blocks in which a DM-RS is transmitted through the other antenna beam b20, and the frequency block block_b is allocated to correspond to one of frequency blocks in which a DM-RS is transmitted through the other antenna beam b10.

The frequency blocks, in which DM-RSs are transmitted for each of the dual antenna beams b10 and b20, have a mutual orthogonality due to FDM-processing. Therefore, the frequency blocks block_a and block_b, which are allocated in order to transmit tracking RSs for each of the dual antenna beams b10 and b20, are mutually orthogonal.

In this configuration, the reference signal transmission method of the base station 100 according to present disclosure punctures a frequency block in the frequency domains of the particular symbol period (D=symbols 2 to 11) for each of the dual antenna beams b10 and b20. The punctured frequency block corresponds to a frequency block allocated for other antenna beam. The punctured frequency block does not transmit a signal in the frequency block, thereby making it possible to ensure a mutual orthogonality.

Then, in operation S170, the reference signal transmission method of the base station 100 according to present disclosure transmits a DM-RS in at least two frequency blocks which are FDM-processed and allocated in the frequency domain of symbol 2, for each of the dual antenna beams b10 and b20.

In the embodiment in which the frequency blocks block_a and block_b are allocated for each of the dual antenna beams b10 and b20 in the above-described scheme, the reference signal transmission method of the base station 100 according to present disclosure punctures a frequency block of at least two allocated frequency blocks in the frequency domain of the particular symbol 2 for each of the dual antenna beams b10 and b20. The punctured frequency block correspond to a frequency block in which a tracking RS is transmitted for other antenna beam. DM-RS is transmitted through a frequency block except the punctured frequency block.

That is, in the case of the antenna beam b10, the reference signal transmission method of the base station 100 according to present disclosure punctures the frequency block block_b, which correspond to a frequency block in which a tracking RS is transmitted for the other antenna beam (i.e., the antenna beam b20) from at least two frequency blocks that are allocated in the frequency domain of symbol 2, and transmits a DM-RS.

Also, in the case of the antenna beam b20, the reference signal transmission method of the base station 100 according to present disclosure punctures the frequency block block_a, which correspond to a frequency block in which a tracking RS is transmitted for the other antenna beam (i.e., the antenna beam b10) from at least two frequency blocks that are allocated in the frequency domain of symbol 2, and transmits a DM-RS.

Further, in operation S180, the reference signal transmission method of the base station 100 according to present disclosure transmits, through the dual antenna beams b10 and b20, tracking RSs in the frequency blocks block_a and block_b which are mutually orthogonal in the frequency domains of the particular symbol period (D=2 to 11) within the reference signal subframe, respectively.

As described above, the reference signal transmission method according to the present disclosure implements a new reference signal transmission scheme appropriate for a 5G environment (i.e., a mobile communication network environment for supporting high-speed and low-latency communication) which will appear afterwards, making it possible to achieve the effect of supporting high-speed and low-latency performance in the 5G environment.

Meanwhile, implementations of the functional operations and subject matter described in this specification can be implemented by a digital electronic circuit, in computer software, firmware, or hardware that includes the structures disclosed in this specification and structural equivalents thereof, or in combinations of one or more thereof. Implementations of the subject matter described in this specification may be implemented as one or more computer program products, that is, one or more modules of computer program instructions, encoded on a tangible program storage medium in order to control an operation of, or for execution by, a processing system.

A computer-readable medium may be a machine-readable storage device, a machine-readable storage substrate, a memory device, a composition of a material affecting a machine-readable radio wave signal, or a combination of one or more thereof.

In this specification, the term "system" or "device" encompasses, for example, a programmable processor, a computer, or all kinds of mechanisms, devices, and machines that include a multiprocessor or a computer and process data. The processing system may include, in addition to hardware, a code that creates an execution environment for a computer program when requesting, for example, a code that constitutes processor firmware, a protocol stack, a database management system, an operating system, or a combination of one or more thereof.

A computer program (also known as a program, software, software application, script, or code) can be written in any form of a programming language, which includes compiled or interpreted languages, or declarative or procedural languages, and it can be deployed in any form, including a stand-alone program or module, a component, a subroutine, or another unit suitable for use in a computing environment. A computer program may, but need not, correspond to a file in a file system. A program can be stored in a single file provided to the requested program, in multiple coordinated files (e.g., files that store one or more modules, sub-programs, or portions of code), or in a portion of a file that holds other programs or data (e.g., one or more scripts stored in a markup language document). A computer program can be deployed to be executed on one computer or on multiple computers that are located at one site or distributed across multiple sites and interconnected by a communication network.

Meanwhile, examples of a computer-readable medium suitable for storing computer program instructions and data may include all forms of non-volatile memory, media, and memory devices, for example, a semiconductor memory device such as an Erasable Programmable Read-Only Memory (EPROM), an Electrically Erasable Programmable Read-Only Memory (EEPROM), and a flash memory device; a magnetic disk such as an internal hard disk or an external disk; a magneto-optical disk; and Compact Disc-Read Only Memory (CD-ROM) and Digital Versatile Disc-Read Only Memory (DVD-ROM) disks. A processor and a memory may be supplemented by, or integrated into, a special-purpose logic circuit.

Implementations of the subject matter described in this specification can be implemented in a computing system that includes a back-end component such as a data server, or that includes a middleware component such as an application server, or that includes a front-end component such as a client computer having a web browser or a graphical user interface through which a user can interact with an implementation of the subject matter described in this specification, or that includes all combinations of one or more of the back-end, middleware, and front-end components. The components of the system can be interconnected by any form or medium of digital data communication, such as a communication network.

Although this specification includes details of multiple specific implementations, the specific implementation details should not be construed as limitations on the scope of any disclosures or of what may be claimed, but rather as descriptions of features specific to particular embodiments of particular disclosures. Similarly, particular features that are described in this specification in the context of separate embodiments can also be implemented in combination in a single embodiment. Conversely, various features that are described in the context of a single embodiment can also be implemented in multiple embodiments separately or in any suitable sub-combination. Further, although features may be described above as acting in particular combinations and even initially claimed as such, in some cases, one or more features from a claimed combination can be excluded from the combination, and the claimed combination may be changed to a sub-combination or variation of a sub-combination.

Also, in this specification, the operations are depicted in a particular order in the drawings, but this depiction should not be understood as requiring that the operations be performed in the particular order shown or in a sequential order, or that all illustrated operations be performed, in order to achieve desirable results. In a particular case, multitasking and parallel processing may be advantageous. Further, the separation of various system components in the above-described embodiments should not be understood as requiring such separation in all embodiments, and it should be understood that the described program components and systems can generally be integrated together in a single software product or packaged into multiple software products.

As described above, the specific terms used in this specification do not limit the present disclosure. Therefore, although the present disclosure has been described in detail with reference to the above-described embodiments, those skilled in the art can apply reconstructions, changes in form, and modifications to the embodiments without departing from the scope of the present disclosure. The scope of the present disclosure is defined by the appended claims, rather than the detailed description, and should be construed as including all modifications and variations derived from the meaning and scope of the claims and concept equivalent thereto.

The invention claimed is:

1. A terminal for transmitting a reference signal in a radio communication system, the terminal comprising:
   a first reference signal transmitter configured to transmit a first reference signal at a particular time point in a subframe of a radio resource for uplink reference signal transmission, the particular time point being determined based on a data channel; and
   a second reference signal transmitter configured to transmit a second reference signal for a particular duration in the subframe of the radio resource, the particular duration being determined based on the data channel, wherein
   the data channel is assigned to a symbol period in a plurality of symbols included in the subframe, the symbol period having consecutive symbols among the plurality of symbols,
   the particular time point corresponds to the first symbol of the symbol period where the transmission of the data channel is started,
   the transmission of the data channel and the transmission of the first reference signal are started at the first symbol of the symbol period in the frame,
   the particular duration corresponds to the symbol period in the subframe, and
   the data channel and the second reference signal are transmitted during the symbol period in the frame.

2. The terminal as claimed in claim 1, wherein the first reference signal transmitter and the second reference signal transmitter are configured to allocate at least one of a frequency resource and a time resource for the first reference signal and the second reference signal for uplink transmission which is multiple of at least one of a frequency resource and a time resource allocated for the first reference signal and the second reference signal for downlink transmission.

3. The terminal as claimed in claim 1, wherein the first reference signal transmitter is configured to transmit the first reference signal in a frequency domain of the first symbol.

4. The terminal as claimed in claim 3, wherein, when the first reference signal is transmitted to a reception apparatus through each of multiple antenna beams, the first reference signal transmitter is configured to:
- allocate at least two orthogonal frequency blocks for each of the multiple antenna beams by frequency division multiplexing (FDM) process for the frequency domain of the first symbol; and
- transmit the first reference signal in the at least two allocated frequency blocks of the frequency domain of the first symbol through each of the multiple antenna beams.

5. The terminal as claimed in claim 4, wherein, when the second reference signal is transmitted to the reception apparatus through each of the multiple antenna beams, the second reference signal transmitter is configured to transmit the second reference signal in each of the orthogonal frequency blocks of frequency domain of the symbol period.

6. The terminal as claimed in claim 5, wherein the orthogonal frequency blocks transmitting the second reference signal for the multiple antenna beams is allocated to be corresponding to one of the frequency blocks transmitting the first reference signal for other antenna beam.

7. The terminal as claimed in claim 4, wherein when the first reference signal transmitter transmits the first reference signal through the multiple antenna beams, the first reference signal transmitter is configured to puncture a frequency block corresponding to a frequency block transmitting the second reference signal for other antenna beam.

8. The terminal as claimed in claim 1, wherein the second reference signal transmitter is configured to transmit the second reference signal in one of remaining frequency blocks in which the first reference signal is not transmitted in frequency domain of the symbol period.

9. A method for transmitting a reference signal by a terminal in a radio communication system, the method comprising:
- transmitting a first reference signal at a particular time point in a subframe of a radio resource for uplink reference signal transmission, the particular time point being determined based on a data channel; and
- transmitting a second reference signal for a particular duration in the subframe of the radio resource, the particular duration being determined based on a data channel,
- wherein
  - the data channel is assigned to a symbol period in a plurality of symbols included in the subframe, the symbol period having consecutive symbols among the plurality of symbols,
  - the particular time point corresponds to the first symbol of the symbol period where the transmission of the data channel is started,
  - the transmission of the data channel and the transmission of the first reference signal are started at the first symbol of the symbol period in the frame,
  - the particular duration corresponds to the symbol period in the subframe, and
  - the data channel and the second reference signal are transmitted during the symbol period in the frame.

10. The method as claimed in claim 9, wherein:
transmitting the first reference signal comprises transmitting the first reference signal in a frequency domain of the first symbol; and
transmitting the second reference signal comprises transmitting the second reference signal in one of remaining frequency blocks in which the first reference signal is not transmitted in frequency domain of the symbol period.

11. The method as claimed in claim 9, wherein:
transmitting the first reference signal comprises, when the first reference signal is transmitted to a reception apparatus through each of multiple antenna beams;
allocating at least two orthogonal frequency blocks for each of the multiple antenna beams by frequency division multiplexing (FDM) process for the frequency domain of the first symbol; and
transmitting the first reference signal in the at least two allocated frequency blocks of the frequency domain of the first symbol through each of the multiple antenna beams.

12. The method as claimed in claim 11, wherein transmitting the second reference signal comprises, when the second reference signal is transmitted to the reception apparatus through each of the multiple antenna beams, transmitting the second reference signal in each of the orthogonal frequency blocks of frequency domain of the symbol period.

13. The method as claimed in claim 12, wherein the orthogonal frequency blocks transmitting the second reference signal for the multiple antenna beams is allocated to be corresponding to one of the frequency blocks transmitting the first reference signal for other antenna beam.

14. The method as claimed in claim 11, wherein transmitting the first reference signal comprises, when the first reference signal transmitter transmits the first reference signal through the multiple antenna beams, puncturing a frequency block corresponding to a frequency block transmitting the second reference signal for other antenna beam.

* * * * *